(12) United States Patent
Li et al.

(10) Patent No.: US 9,952,367 B2
(45) Date of Patent: Apr. 24, 2018

(54) WIRE GRID POLARIZER AND MANUFACTURING METHOD THEREOF, AND DISPLAY DEVICE

(71) Applicant: BOE TECHNOLOGY GROUP CO., LTD., Beijing (CN)

(72) Inventors: Yingyi Li, Beijing (CN); Yanbing Wu, Beijing (CN); Chunyan Ji, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/890,782

(22) PCT Filed: May 7, 2015

(86) PCT No.: PCT/CN2015/078480
§ 371 (c)(1),
(2) Date: Nov. 12, 2015

(87) PCT Pub. No.: WO2016/107041
PCT Pub. Date: Jul. 7, 2016

(65) Prior Publication Data
US 2016/0327713 A1  Nov. 10, 2016

(30) Foreign Application Priority Data

Dec. 30, 2014 (CN) .......................... 2014 1 0843630

(51) Int. Cl.
*G02B 5/30* (2006.01)
*G02F 1/1335* (2006.01)
(Continued)

(52) U.S. Cl.
CPC ...... *G02B 5/3058* (2013.01); *B29D 11/00644* (2013.01); *G02F 1/133528* (2013.01);
(Continued)

(58) Field of Classification Search
CPC ................. G02B 5/3058; G02F 1/1335; G02F 1/133528; G02F 2001/133548;
(Continued)

(56) References Cited

U.S. PATENT DOCUMENTS 7,605,883 B2 * 10/2009 Yamaki ................ G02B 5/3058
349/96
7,692,860 B2  4/2010 Sato et al.
(Continued)

FOREIGN PATENT DOCUMENTS

CN   1737615 A   2/2006
CN   1952700 A   4/2007
(Continued)

OTHER PUBLICATIONS

Machine Translation of JP 2011-221-412A from https://www4.j-platpat. inpit.go.jp/cgi-bin/tran_web_cgi_ejje?u=http://www4.j-platpat.inpit.go.jp/eng/translation/20161211153120007121112184045501833​28C3FAC6E9ACEFEF159111737211820. Downloaded Dec. 11, 2016.*
(Continued)

*Primary Examiner* — Frank Font
(74) *Attorney, Agent, or Firm* — Collard & Roe, P.C.

(57) ABSTRACT

Disclosed are a wire grid polarizer and a manufacturing method thereof, and a display device, which relate to the display technical field. The manufacturing method of the wire grid polarizer includes: coating a polymer monomer on the surface of the base substrate; subjecting the polymer monomer at a position corresponding to the resin protrusions to a curing treatment; forming a pattern of the resin protrusions disposed on the surface of the base substrate with intervals being provided between the resin protrusions; forming a metal layer on the surface of the resin protrusions; and forming a pattern of wire grid formed of the metal wires
(Continued)

disposed on the surface of the resin protrusions with intervals being provided between the metal wires by a single patterning process, such that each of the metal wires covers at least one surface for polarization of one resin protrusion.

20 Claims, 6 Drawing Sheets

(51) Int. Cl.
  *B29D 11/00* (2006.01)
  *B29K 33/04* (2006.01)
  *B29K 105/00* (2006.01)
(52) U.S. Cl.
  CPC .. *B29K 2033/04* (2013.01); *B29K 2105/0002* (2013.01); *G02F 2001/133548* (2013.01)
(58) Field of Classification Search
  CPC .......... B29D 11/00644; B29K 2033/04; B29K 2105/0002
  USPC ....... 359/485.05, 487.03; 349/96; 427/163.1, 427/466; 430/321
  See application file for complete search history.

(56) References Cited

U.S. PATENT DOCUMENTS

| | | | |
|---|---|---|---|
| 8,623,161 B2 * | 1/2014 | Kaida | G02B 5/3058 156/246 |
| 8,693,094 B2 * | 4/2014 | Louh | B82Y 30/00 359/487.06 |
| 8,730,575 B2 | 5/2014 | Kaida et al. | |
| 8,896,920 B2 * | 11/2014 | Jung | G02F 1/133536 359/485.05 |
| 8,902,380 B2 | 12/2014 | Lu | |
| RE45,642 E * | 8/2015 | Takada | G02B 5/3058 |
| 2006/0279842 A1 * | 12/2006 | Kim | G02B 5/3058 359/485.05 |
| 2007/0159577 A1 | 7/2007 | Atsushi et al. | |
| 2007/0242187 A1 * | 10/2007 | Yamaki | G02B 5/3058 349/96 |
| 2008/0118660 A1 | 5/2008 | Choi et al. | |
| 2008/0129931 A1 * | 6/2008 | Takahashi | G02B 5/3058 349/96 |
| 2008/0186576 A1 * | 8/2008 | Takada | G02B 5/3025 359/487.03 |
| 2008/0303986 A1 * | 12/2008 | Yamaki | G02B 5/3058 349/96 |
| 2009/0027773 A1 | 1/2009 | Kawakami | |
| 2009/0052030 A1 * | 2/2009 | Kaida | B82Y 10/00 359/485.05 |
| 2009/0067047 A1 * | 3/2009 | Ueda | G02B 1/105 359/485.01 |
| 2010/0007827 A1 | 1/2010 | Nishimura et al. | |
| 2011/0080640 A1 * | 4/2011 | Kaida | G02B 5/3058 359/485.05 |
| 2011/0096396 A1 * | 4/2011 | Kaida | C23C 14/024 359/492.01 |
| 2012/0164317 A1 * | 6/2012 | Kim | B82Y 30/00 427/122 |
| 2012/0236410 A1 * | 9/2012 | Akita | G02B 5/3058 359/485.05 |
| 2013/0033659 A1 | 2/2013 | Chung et al. | |
| 2013/0040052 A1 * | 2/2013 | Akita | C23C 14/0021 427/163.1 |
| 2014/0211316 A1 * | 7/2014 | Furui | B32B 7/02 359/599 |
| 2014/0293142 A1 * | 10/2014 | Kawazu | G03B 21/14 349/5 |
| 2015/0227230 A1 * | 8/2015 | Cok | G06F 3/044 345/174 |
| 2016/0341861 A1 * | 11/2016 | Li | B29D 11/00644 |
| 2017/0205551 A1 * | 7/2017 | Li | G02B 5/3058 |

FOREIGN PATENT DOCUMENTS

| | | | | |
|---|---|---|---|---|
| CN | 101116018 A | 1/2008 | | |
| CN | 101354458 A | 1/2009 | | |
| CN | 101416083 A | 4/2009 | | |
| CN | 101419298 A | 4/2009 | | |
| CN | 101548206 A | 9/2009 | | |
| CN | 101900841 A | 12/2010 | | |
| CN | 101981479 A | 2/2011 | | |
| CN | 102087377 A | 6/2011 | | |
| CN | 102096134 A | 6/2011 | | |
| CN | 102308234 A | 1/2012 | | |
| CN | 102540306 A | 7/2012 | | |
| CN | 102576107 A | 7/2012 | | |
| CN | 202433543 U | 9/2012 | | |
| CN | 102713697 A | 10/2012 | | |
| CN | 102914901 A | 2/2013 | | |
| CN | 103998956 A | 8/2014 | | |
| CN | 104297835 A | 1/2015 | | |
| CN | 104459865 A | 3/2015 | | |
| CN | 104483733 A | 4/2015 | | |
| EP | 1 775 607 A1 | 4/2007 | | |
| EP | 1775607 A1 * | 4/2007 | .......... | G02B 5/3058 |
| EP | 2 023 169 A1 | 2/2009 | | |
| JP | 2006-184624 A | 7/2006 | | |
| JP | 2007-017641 A | 1/2007 | | |
| JP | 2007-121507 A | 5/2007 | | |
| JP | 2008-145581 A | 6/2008 | | |
| JP | 2010-266483 A | 11/2010 | | |
| JP | 2011-221412 * | 11/2011 | ............... | G02B 5/30 |
| JP | 2012-168301 A | 9/2012 | | |
| KR | 10-2008-0057063 A | 6/2008 | | |
| KR | 10-2010-0035347 A | 4/2010 | | |
| WO | 2007/116972 A1 | 10/2007 | | |
| WO | WO 2007116972 A1 * | 10/2007 | ............. | B82Y 10/00 |
| WO | WO 2010126110 A1 * | 11/2010 | ........... | G02B 5/3058 |

OTHER PUBLICATIONS

International Search Report of PCT/CN2015/078480 in Chinese, dated Sep. 7, 2015 with English translation.
Notice of Transmittal of the International Search Report of PCT/CN2015/078480 in Chinese, dated Sep. 7, 2015.
Written Opinion of the International Searching Authority of PCT/CN2015/078480 in Chinese, dated Sep. 7, 2015 with English translation.
Chinese Office Action in Chinese Application No. 201410843630.5, dated May 3, 2016 with English translation.
Third Chinese Office Action in Chinese Application No. 201410843630.5, dated Jan. 18, 2017 with English translation.
International Search Report of PCT/CN2015/078474 in Chinese, dated Sep. 29, 2015 with English translation.
Notice of Transmittal of the International Search Report of PCT/CN2015/078474 in Chinese, dated Sep. 29, 2015.
Written Opinion of the International Searching Authority of PCT/CN2015/078474 in Chinese, dated Sep. 29, 2015 with English translation.
Chinese Office Action in Chinese Application No. 201410841901.3 dated May 19, 2016 with English translation.
Second Chinese Office Action in Chinese Application No. 201410841901.3, dated Nov. 28, 2016 with English translation.
Second Chinese Office Action in Chinese Application No. 201410843630.5, dated Oct. 18, 2016 with English translation.
Restriction Requirement in U.S. Appl. No. 14/893,703, dated Apr. 11, 2017.
Non-Final Office Action in U.S. Appl. No. 14/893,703, dated Jul. 12, 2017.
International Search Report of PCT/CN2015/073641 in Chinese, dated May 29, 2015 with English translation.
Notice of Transmittal of the International Search Report of PCT/CN2015/073641 in Chinese, dated May 29, 2015.
Written Opinion of the International Searching Authority of PCT/CN2015/073641 in Chinese, dated May 29, 2015 with English translation.

(56) References Cited

OTHER PUBLICATIONS

International Preliminary Report on Patentability and Written Opinion of the International Searching Authority of PCT/CN2015/073641, dated Apr. 18, 2017.
First Chinese Office Action in Chinese Application No. 201410554865.2, dated Feb. 3, 2016 with English translation.
Second Chinese Office Action in Chinese Application No. 201410554865.2, dated Jul. 12, 2016 with English translation.
Non-Final Office Action in U.S. Appl. No. 15/324,392, dated May 31, 2017.
Third Chinese Office Action in Chinese Application No. 201410841901.3, dated Jun. 1, 2017 with English translation.
Fourth Chinese Office Action in Chinese Application No. 201410843630.5, dated Jun. 14, 2017 with English translation.
Final Office Action in U.S. Appl. No. 14/893,703, dated Dec. 19, 2017.

* cited by examiner

Prior art

Figure 1a

Prior art

WIRE GRID POLARIZER AND MANUFACTURING METHOD THEREOF, AND DISPLAY DEVICE

CROSS REFERENCE TO RELATED APPLICATIONS

This application is the National Stage of PCT/CN2015/078480 filed May 7, 2015, which claims priority under 35 U.S.C. § 119 of Chinese Application No. 201410843630.5 filed on Dec. 30, 2014, the disclosure of which is incorporated by reference.

TECHNICAL FIELD

The present invention relates to a wire grid polarizer and a manufacturing method thereof, and a display device comprising the wire grid polarizer.

BACKGROUND

As a flat display device, TFT-LCD (Thin Film Transistor Liquid Crystal Display) is applied in the field of high performance display increasingly because of its characteristics including small size, low power consumption, no irradiation, relatively low fabrication cost, etc.

Figure 1A:
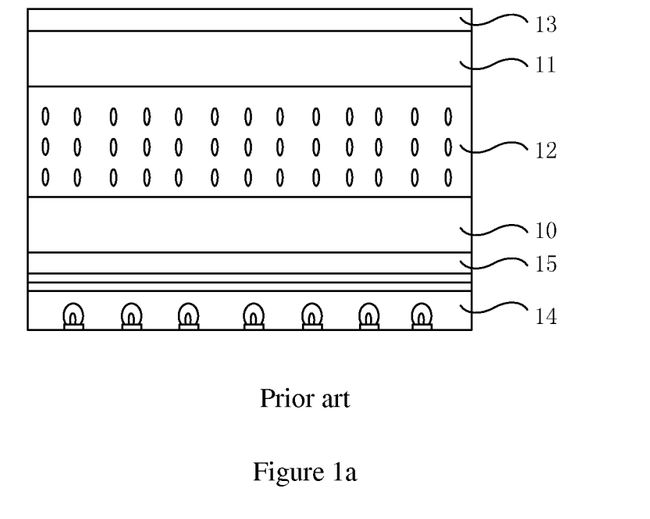
FIG. 1*a* is a schematic structural view of a display device provide by prior art.

As shown in FIG. 1a, a TFT-LCD comprises an array substrate 10 and a color filter substrate 11. A liquid crystal layer 12 is disposed between the array substrate 10 and the color filter substrate 11. Furthermore, a first polarizer 13 is disposed on an upper surface of the color filter substrate 11, and a second polarizer 15 is disposed between the array substrate 10 and a backlight module 14. In some embodiments, an optic axis of the first polarizer 13 is perpendicular to an optic axis of the second polarizer 15. If no electric field is applied to the liquid crystal layer 12, light emitted from the backlight module 14 will enter the liquid crystal layer 12 by passing through the second polarizer 15, and liquid crystal molecules will rotate the direction of the incident light, such that it will emit from the first polarizer 13. If an electric field is applied to the liquid crystal layer, the arrangement direction of liquid crystal molecules in the liquid crystal layer 12 will be changed, such that the incident light cannot penetrate it. As such, light intensity can be controlled accordingly, and a color image can be displayed by virtue of light filtration effects of the color filter substrate 11.

In prior art, said polarizer (the first polarizer 13 and the second polarizer 15) can be formed with a polyvinyl alcohol (PVA) thin film. One polarized component of natural light will transmit and another component will be absorbed by the polarizer. As such, it may cause a significant loss of light, and thus significantly decrease light utilization efficiency.

Figure 1B:
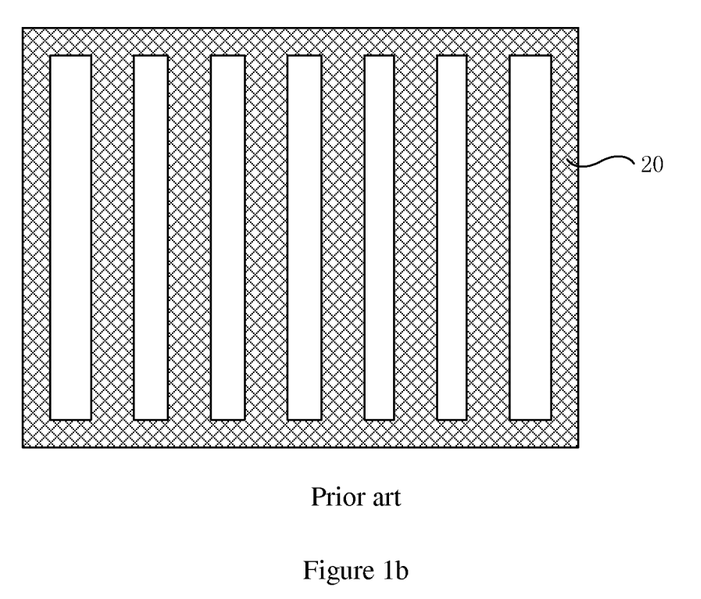
FIG. 1*b* is a schematic structural view of a wire grid polarizer provided by prior art.

In order to solve above problems, in prior art, there provides a wire grid polarizer 20 formed of a metal material, as shown in FIG. 1b. When light enters the wire grid polarizer 20, with the oscillation effect of free electrons on a surface of the metal, light oscillating parallel to an electrical field vector component of the wire grid is almost all reflected, whereas almost all light oscillating perpendicular to the electrical field vector component of the wire grid transmits. Furthermore, the light reflected by the wire grid polarizer 20 can be reused, such that the utilization efficiency of light is improved effectively.

However, in prior art, during the process for manufacturing the above wire grid polarizer 20, a metal target material is required, which should be subjected to a evaporation magnetron sputtering process to form a metal thin film on a substrate, and thus there is a significant consumption of the target material. In addition, during the process for forming a wire grid pattern by a patterning process, a part of the metal thin film layer needs to be removed, resulting significant waste of the target material. Therefore, a prior art method has high cost because of the higher cost of a metal material.

SUMMARY

The present invention provides a wire grid polarizer, a manufacturing method thereof, and a display device. The problem of high manufacture cost in a manufacture process of a wire grid polarizer can be solved.

In order to achieve the above objectives, embodiments of the present invention adopt the following technical solutions.

In an aspect of an embodiment of the present invention, there provides a wire grid polarizer, comprising: a base substrate; resin protrusions disposed on a surface of the base substrate with intervals being provided between the resin protrusions; metal wires disposed on the surface of the base substrate with intervals being provided between the metal wires, the metal wires forming a pattern of wire grid; wherein each of the metal wires covers at least one surface for polarization of the resin protrusions, and the surface for polarization is at least one of an upper surface and a side surface of the resin protrusions, and the side surface is parallel to an arrangement direction of the wire grid.

In some embodiments, each of the metal wires covers at least one surface for polarization of one resin protrusion.

In another aspect of an embodiment of the present invention, there provides a manufacturing method of the wire grid polarizer, comprising: coating a polymer monomer on the surface of the base substrate; subjecting the polymer monomer corresponding to a preset position (that is, corresponding to the resin protrusions) to a curing treatment; forming a pattern of the resin protrusions disposed on the surface of the base substrate with intervals being provided between the resin protrusions; forming a metal layer on the surface of the substrate provided with the resin protrusions; and forming a pattern of wire grid formed of the metal wires disposed on the surface of the base substrate with intervals being provided between the metal wires by a single patterning process, wherein each of the metal wires covers at least one surface for polarization of the resin protrusions, and the surface for polarization is at least one of an upper surface and a side surface of the resin protrusions, and the side surface is parallel to an arrangement direction of the wire grid.

In another aspect of an embodiment of the present invention, there provides a wire grid polarizer, comprising: a base substrate; resin protrusions disposed on a surface of the base substrate with intervals being provided between the resin protrusions; metal wires disposed on the surface of the base substrate with intervals being provided between the metal wires; wherein each of the metal wires covers at least one surface for polarization of the resin protrusions, and the surface for polarization is at least one of an upper surface and a side surface of the resin protrusions, and the side surface is parallel to an arrangement direction of the wire grid.

In another aspect of an embodiment of the present invention, there provides a display device, comprising any one of above wire grid polarizer.

An embodiment of the present invention provides a wire grid polarizer and a manufacturing method thereof, and a display device. In an embodiment, the manufacturing method of the wire grid polarizer comprises: firstly, coating a polymer monomer on the surface of a base substrate; and then, subjecting the polymer monomer corresponding to a preset position to a curing treatment, such that the polymer monomer at the preset position is cured. In some embodiments, an uncured polymer monomer at a position except the preset position can be removed before or after this step, such that a pattern of resin protrusions can be formed on the surface of the base substrate with intervals being provided between the resin protrusions. Then, forming a metal layer on the surface of the substrate provided with the resin protrusions, and forming a pattern of wire grid formed of the metal wires disposed on the surface of the base substrate with intervals being provided between the metal wires by a single patterning process. In some embodiments, each of the metal wires covers at least one surface for polarization of one resin protrusion. Under the circumstances, in an aspect, an incident light can be polarized by oscillation properties of free electrons in the metal wire covering the resin protrusions, such that a wire grid polarizer with reflection properties can be formed. In another aspect, since the resin protrusions are formed of resin materials, the consumption of metal materials can be reduced in the manufacturing of the wire grid polarizer, and the manufacture cost can be reduced because the cost of a resin material is relatively low in comparison with a metal target material.

BRIEF DESCRIPTION OF THE DRAWINGS

Simple description will be given below to the accompanying drawings of the embodiments to provide a clearer illustration of the technical proposals of the embodiments of the present invention. Obviously, the drawings described below only involve some embodiments of the present invention but are not intended to limit the present invention.

DETAILED DESCRIPTION

For clearer understanding of the objectives, technical proposals and advantages of the embodiments of the present invention, clear and complete description will be given below to the technical proposals of the embodiments of the present invention with reference to the accompanying drawings of the embodiments of the present invention. Obviously, the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Figure 2:
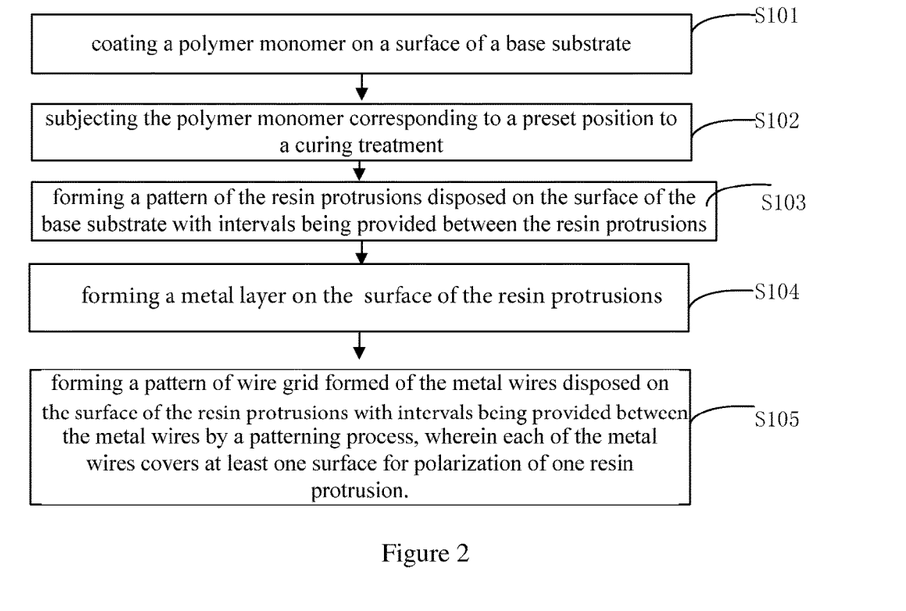
FIG. 2 is a flowchart of a manufacturing method of a wire grid polarizer provided by an embodiment of the present invention.

An embodiment of the present invention provide a manufacturing method of a wire grid polarizer, which may comprises the following steps S101 to S105 as shown in FIG. 2.

Figure 4A:
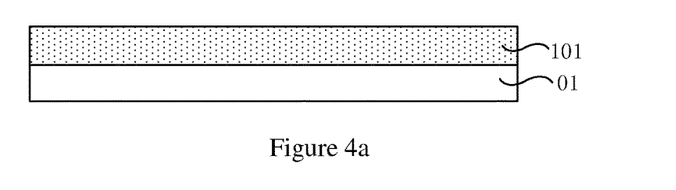
FIG. 4*a* to FIG. 4*g* are a schematic structural view of each process of a manufacturing method of a wire grid polarizer provided by an embodiment of the present invention.

S101: coating a polymer monomer 101 on a surface of a base substrate 01, as shown in FIG. 4*a*.

In some embodiments, a material for forming the base substrate 01 may comprise at least one of glass and quartz. If a wire grid polarizer is intended to be applied in a flexible display device, a material for forming the base substrate 01 can comprise at least one of polyethylene glycol terephthalate (PET) and cellulose triacetate (TAC), in order to satisfy the requirements of bending and rolling for design of a flexible display device.

S102: subjecting the polymer monomer 101 corresponding to a preset position to a curing treatment.

S103: forming a pattern of the resin protrusions 110 disposed on the surface of the base substrate 01 with intervals being provided between the resin protrusions.

S104: forming a metal layer 102 on the surface of the substrate 110 provided with the resin protrusions.

S105: forming a pattern of wire grid formed of the metal wires 111 disposed on the surface of the base substrate 01 with intervals being provided between the metal wires by a patterning process.

Figure 4B:
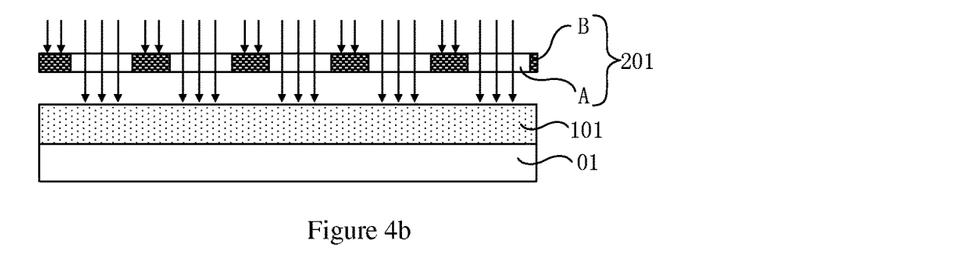
Figure 4C:
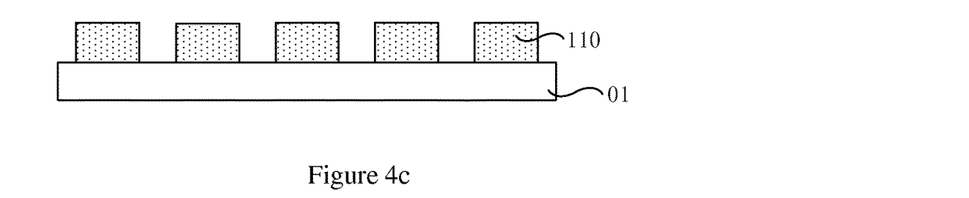
Figure 4D:
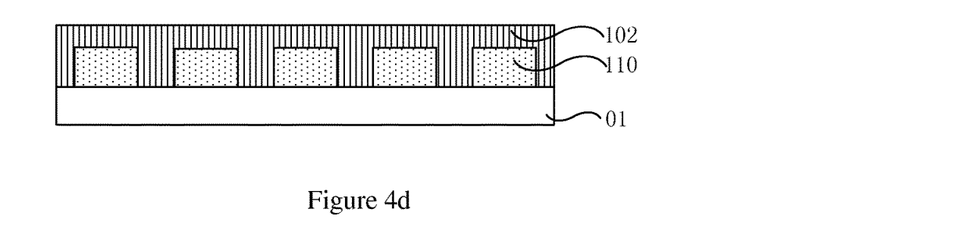
Figure 4E:
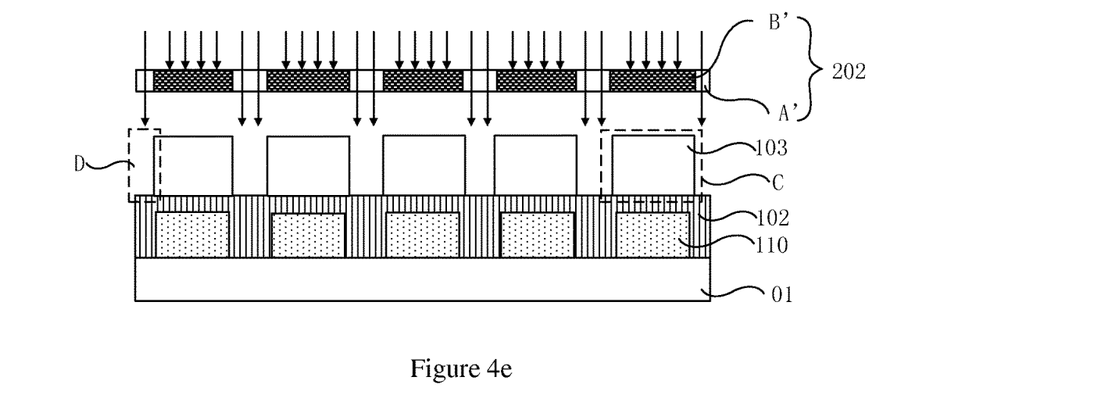

In some embodiments, each of the metal wires 111 can cover at least one surface for polarization E of the resin protrusions 110. In some embodiments, each of the metal wires 111 can cover at least one surface for polarization E of one resin protrusion 110. As shown in FIG. 4*h*, the surface for polarization E can be either an upper surface E1 or a side surface E2 of the resin protrusions 110, and the side surface E2 is parallel to an arrangement direction X of the wire grid (in other words, along the arrangement direction X of the wire grid).

An embodiment of the present invention provides a manufacturing method of a wire grid polarizer, comprising: firstly, coating a polymer monomer on a surface of a base substrate; and then, subjecting the polymer monomer corresponding to a preset position (corresponding to a position of the resin protrusions) to a curing treatment, such that the polymer monomer at the preset position is cured. In some embodiments, an uncured polymer monomer at a position except the preset position (that is, except the position corresponding to the resin protrusions) is removed before or after this step, such that a pattern of the resin protrusions is formed on the surface of the base substrate with intervals being provided between the resin protrusions. Then, forming a metal layer on the surface of the substrate provided with the resin protrusions, and forming a pattern of wire grid formed of the metal wires disposed on the surface of the base substrate with intervals being provided between the metal wires by a single patterning process. In some embodiments, a metal wire covers at least one surface for polarization of the resin protrusions. In some embodiments, each of the metal wires covers at least one surface for polarization of one resin protrusion. Under the circumstances, in an aspect, an incident light can be polarized by oscillation properties of free electrons in the metal wire covering the resin protrusions, such that a wire grid polarizer with reflection properties can be formed. In another aspect, since the resin protrusions are formed of resin materials, the consumption of metal materials can be reduced in the manufacturing of the wire grid polarizer, and the manufacture cost can be reduced because the cost of a resin material is lower than the cost of a metal target material.

It should be noted that: firstly, a material forming the polymer monomer 101 may comprise an acrylic monomer, such as at least one of methyl acrylate, ethyl acrylate, n-butyl acrylate, methyl methacrylate and n-butyl methacrylate.

Secondly, the curing treatment in the embodiments of the present invention means subjecting a material constituting the polymer monomer 101 to a chemical reaction, with the aid of heating, pressuring, a curing agent or UV light, such that a chemical bond is formed among their linear molecules, and connects the linear molecules together in order to form a network structure and finally form an insoluble and infusible substance by a crosslinking curing process. If a polymer monomer 101 comprising an acrylic monomer is subjected to above curing treatment, an acrylic polymer can be formed. The following embodiments of the present invention are illustrated by using a UV light irradiation process as the curing treatment process.

Thirdly, a material for forming the above metal layer 102 can comprise at least one selected from the group consisting of elementary substance aluminum, elementary substance copper, and elementary substance iron. Elementary substance aluminum contains more free electrons because it has greater conductivity. Whereas, the polarization of an incident light by a wire grid polarizer in the present invention is just achieved using oscillation properties of free electrons in a metal. Therefore, a preferred material for forming the metal layer 102 in an embodiment of the present invention is aluminum or an aluminum alloy.

Fourthly, a wire grid polarizer 20 having a wire grid pattern is required to have a polarization effect for an incident light, under the circumstances, it is required that a period T (an distance between the centers of two adjacent metal wires 111) of the metal wires constituting the pattern of wire grid is less than or equal to half of the wavelength of an incident light.

Furthermore, the preset position mentioned above is a position corresponding to the metal wires 111, and the position of the metal wires 111 relates to the incident light. Therefore, a preset position can be set according to different incident light. For example, if an incident light is visible light, the period T of the metal wires 111 can be less than or equal to 200 nm, because of the wavelength of a visible light is 400-800 nm Therefore, a preset position can be set according to a period T (the distance between the centers of two adjacent metal wires 111) of ≤200 nm. Also, for example, when the wire grid polarizer mentioned above is applied to an IR camera, the period T of the metal wires 111 can be less than or equal to 380 nm, because of the wavelength of IR light, as the incident light, is 760 nm-1 mm Therefore, a preset position can be set according to a period T of ≤380 nm.

As long as a wire grid polarizer can be used regularly, the period T of the metal wires 111 is preferred to be as small as possible. However, with the decreasing of the period T of the metal wires 111, an increased manufacturing precision is required, and the difficulty in processing is increased. Therefore, a preferred period T of the metal wires 111 in the present invention is less than or equal to 100 nm by taking both the difficulty in processing and the polarization effect into consideration.

Fifthly, in the present invention, a patterning process can comprise a photolithography process or can comprise a photolithography process as well as an etching step, and can also comprise a further process for forming a preset pattern, such as printing, ink-jetting, and the like. A photolithography process refers to a process for forming a pattern using a photoresist, a mask plate, an exposure machine, and the like, and comprises processing steps such as film-forming, exposing, developing, and the like. A patterning process can be selected according to a structure formed in the embodiments of the present invention.

In some embodiments, a single patterning process in an embodiment of the present invention refers to an process comprising forming various exposed areas by a single mask exposure process, subjecting the various exposed areas to multiple removing processes such as an etching process, an ashing process, and the like, to obtain a desired pattern.

A manufacturing method of the wire grid polarizer mentioned above will be described in detail by the following specific embodiments.

Example 1

Figure 3:
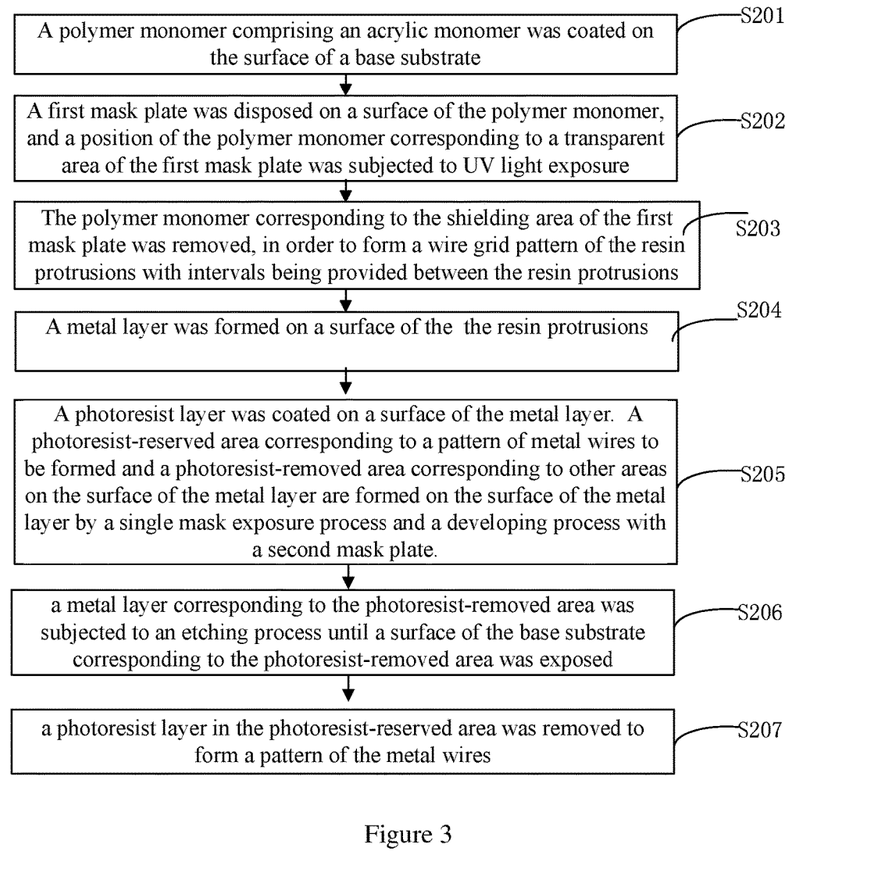
FIG. 3 is a flowchart of a manufacturing method of another wire grid polarizer provided by an embodiment of the present invention.

S201: A polymer monomer 101 comprising an acrylic monomer was coated on the surface of a base substrate 01, as shown in FIG. 3 and FIG. 4a.

S202: A first mask plate 201 was disposed on a surface of the polymer monomer 101, and a position of the polymer monomer 101 corresponding to a transparent area A of the first mask plate 201 was subjected to UV light exposure, as shown in FIG. 4b.

For example, the first mask plate 201 also comprises an opaque shielding area B, such that with shielding by the shielding area B, a polymer monomer 101 at a position corresponding to the shielding area B will not be irradiated by UV light and thus will not be cured.

S203: The polymer monomer 101 corresponding to the shielding area B of the first mask plate 201 was removed, in order to form a pattern of the resin protrusions 110 with intervals being provided between the resin protrusions, as shown in FIG. 4c.

For example, since the polymer monomer 101 corresponding to the shielding area B of the first mask plate 201 is not cured and is flowable, a substrate after being subjected to step 202 can be washed with a solvent capable of dissolving the polymer monomer.

S204: A metal layer 102 was formed on a surface of the substrate provided with resin protrusions 110. Specifically, atoms or molecules of a metal target material can be deposited onto a surface of the substrate provided with the resin protrusions 110 by a magnetron sputtering method, as shown in FIG. 4d.

For example, a sum of a thickness of the polymer monomer 101 formed on a surface of the base substrate 01 in step S101 or step S201 and a thickness of the metal layer 102 formed in step S204 can be 20 nm-100 nm, such that a sum of a thickness of the obtained resin protrusions and a thickness of the obtained metal wires is 20 nm-100 nm. In one aspect, if a sum of a thickness of the polymer monomer 101 and a thickness of the metal layer 102 is less than 20 nm, a segment difference (height difference) between the formed metal wires 111 and base substrate 01 will be too small, such that the obtained wire grid polarizer cannot polarize an incident light. In another aspect, if a sum of a thickness of the polymer monomer 101 and a thickness of the metal layer 102 is greater than 100 nm, the thickness of the wire grid polarizer will be too thick, such that a display device thus manufactured will not meet the trend of ultrathining.

For example, as long as the above thickness is achieved and the formed wire grid polarizer can polarize an incident light, the thickness of the polymer monomer 101 can be increased as much as possible to reduce the manufacture cost.

S205: A photoresist layer 103 was coated on a surface of the metal layer 102, as shown in FIG. 4e. A photoresist-reserved area C corresponding to a pattern of metal wires 111 to be formed and a photoresist-removed area D corresponding to other areas on the surface of the metal layer 111 are formed on the surface of the metal layer 102 by a single mask exposure process and a developing process with a second mask plate 202.

It should be noted that, a transparent area A' of the second mask plate 202 corresponds to the photoresist-removed area D, and an opaque area B' corresponds to the photoresist-reserved area C. For example, a width of the opaque area B' of the second mask plate 202 can be less than or equal to 50 nm, such that a width of the formed metal wires 111 is less than or equal to 50 nm, such that the finally produced wire grid polarizer has better polarization effect. In addition, in order to ensure that each of the formed metal wires 111 can cover a resin protrusion 110, a width of a transparent area A of the first mask plate 201 in step S202 should less than a width of an opaque area B' of the second mask plate 202.

Figure 4F:
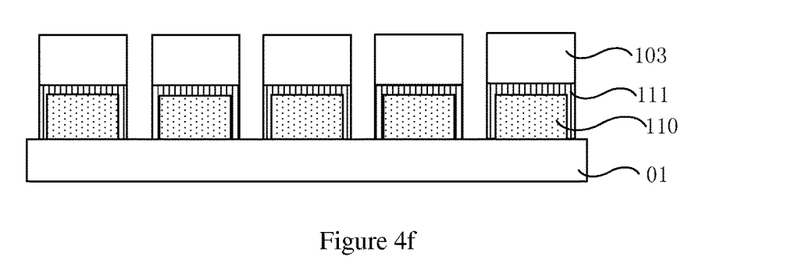

S206: a metal layer 102 corresponding to the photoresist-removed area D was subjected to an etching process until a surface of the base substrate 01 corresponding to the photoresist-removed area D was exposed, as shown in FIG. 4f.

Figure 4G:
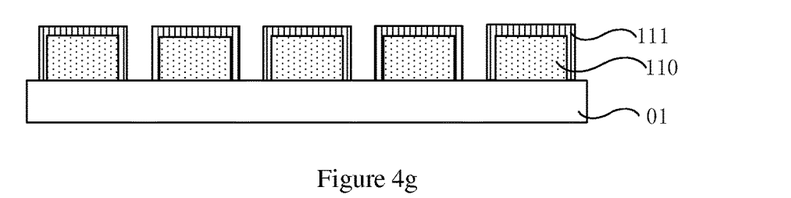
Figure 4H:
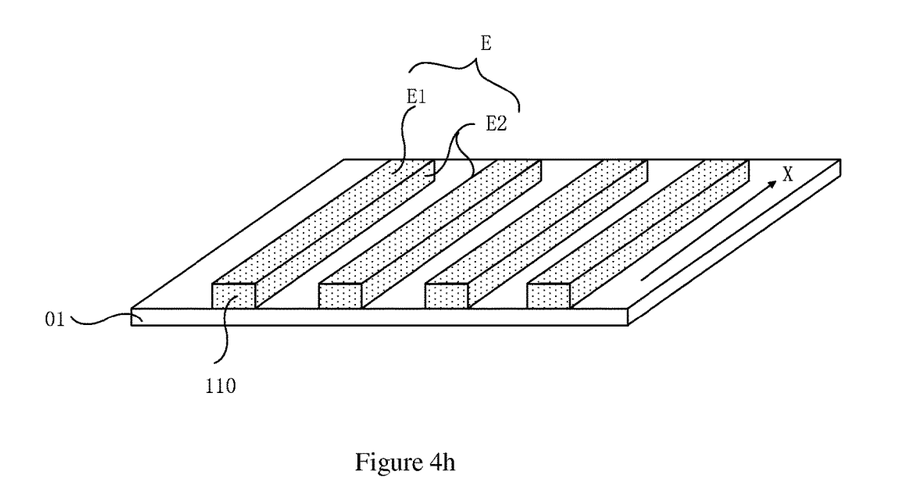
FIG. 4*h* is a 3-dimensional schematic structural view of resin protrusions provided by an embodiment of the present invention.

S207: a photoresist layer 103 in the photoresist-reserved area C was removed to form a pattern of the metal wires 111, as shown in FIG. 4g.

Example 2

Figure 5:
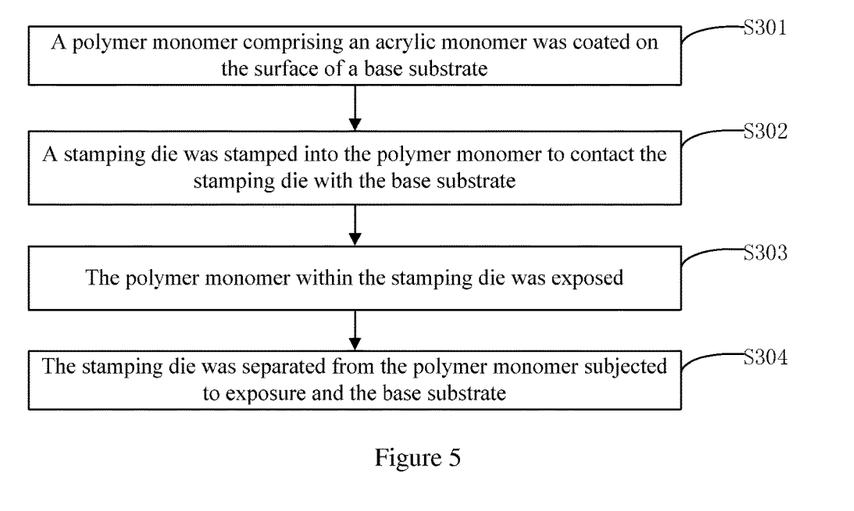
FIG. 5 is a flowchart of a manufacturing method of another wire grid polarizer provided by an embodiment of the present invention.

S301: A polymer monomer 101 comprising an acrylic monomer was coated on the surface of a base substrate 01, as shown in FIG. 5.

S302: A stamping die 203 was stamped into the polymer monomer 101 to contact the stamping die with the base substrate 01, such that the polymer monomer 101 can be encapsulated into a groove of the stamping die 203.

S303: The polymer monomer 101 within the stamping die 203 was exposed.

Figure 6:
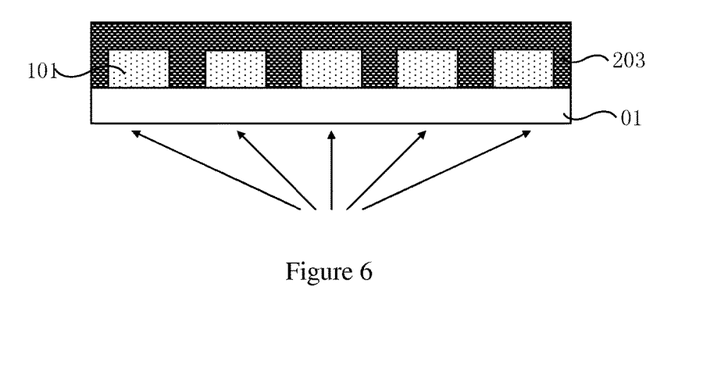
FIG. 6 is a schematic structural view of a process of a manufacturing method of a wire grid polarizer provided by an embodiment of the present invention.

For example, if the stamping die 203 is formed of an opaque material, the polymer monomer 101 within the stamping die 203 can be exposed from the side of the base substrate 01 facing away from the stamping die 203, as shown in FIG. 6.

For example, the stamping die 203 mentioned above is preferred formed of a transparent material, such that not only the polymer monomer 101 within the stamping die 203 can be exposed from the side of the base substrate 01 facing away from the stamping die 203, but also a light source can be set on an upper surface of the stamping die 203. In addition, since the stamping die 203 is transparent, light can transmit into the stamping die 203 and transmit the sidewall of a groove of the stamping die 203, such that the polymer monomer 101 in a groove is subjected to a curing treatment. It increases the contact area between the polymer monomer 101 in the groove and UV light, shortens UV curing period, and increases productivity.

S304: The stamping die 203 was separated from the polymer monomer 101 subjected to exposure and the base substrate 01 to form a pattern of wire grid formed of resin protrusions 110 with intervals being provided between the resin protrusions, as shown in FIG. 4c.

It should be noted that, firstly, after step S304, the step of forming a wire grid pattern formed of metal wires 111 with intervals being provided between the metal wires 111 can be the same as steps S204-S207.

Secondly, during the process for forming the metal wires 111, since a width of the opaque area B' of the second mask plate 202 is preferably less than or equal to 50 nm, a width of the formed metal wires 111 will be less than or equal to 50 nm, such that the finally produced wire grid polarizer has better polarization effect. Therefore, a width of the groove of the stamping die 202 in step S302 can be less than a width of the opaque area B' of the second mask plate 202 to ensure that the formed metal wire 111 can encapsulate (cover) the resin protrusions 110.

In comparison to example 1, since the polymer monomer 101 between two adjacent preformed resin protrusions 110 has been extruded out during the stamping process in example 2, step S203 for removing uncured polymer monomer 101 in example 1 can be avoid. In this way, residue of partial uncured polymer monomer 101 being remained due to an insufficient removal during the process for removing uncured polymer monomer 101 can be avoid. However, in example 2, the polymer monomer 101 being extruded out during the stamping process should be cleaned, in order to avoid contaminating the wire grid polarizer. Therefore, those skilled in the art can select a proper manufacturing method of a wire grid polarizer according to practical requirements.

The above embodiments are only illustrative manufacturing methods of a wire grid polarizer. Other manufacturing processes are also within the protection scope of the present invention, although not described herein in detail.

In an embodiment of the present invention, there provides a wire grid polarizer, as shown in FIG. 4g, comprising: a base substrate 01; resin protrusions 110 disposed on a surface of the base substrate 01 with intervals being provided between the resin protrusions 110; metal wires 111 disposed on the surface of the base substrate with intervals being provided between the metal wires.

For example, each of the metal wires 111 covers at least one surface for polarization E of resin protrusions 110. For example, each of the metal wires 111 covers at least one surface for polarization E of one resin protrusion 110. The surface for polarization E is at least one of an upper surface E1 and a side surface E2 of the resin protrusions 110, and the side surface E2 that is parallel to an arrangement direction X of the wire grid (or along the arrangement direction X of the wire grid), as shown in FIG. 4h.

It should be noted that: firstly, a material for forming the resin protrusions 110 can comprise an acrylic polymer. For example, an acrylic polymer can be formed by polymerization of an acrylic monomer. Said acrylic monomer can be at least one selected from the group consisting of methyl acrylate, ethyl acrylate, n-butyl acrylate, methyl methacrylate and n-butyl methacrylate.

Secondly, a material for forming the above metal wires 111 can comprise at least one selected from the group consisting of elementary substance aluminum, elementary substance copper, and elementary substance iron. Elementary substance aluminum contains more free electrons because it has greater conductivity. Whereas, the polarization of an incident light by a wire grid polarizer in the present invention is just achieved using oscillation properties of free electrons in a metal. Therefore, a preferred material for forming the metal wires 111 in an embodiment of the present invention is aluminum or an aluminum alloy.

An embodiment of the present invention provides a wire grid polarizer, comprising: a base substrate, resin protrusions disposed on a surface of the base substrate with intervals being provided between the resin protrusions, and metal wires disposed on the surface of the base substrate with intervals being provided between the metal wires.

For example, a metal wire covers at least one surface for polarization of a resin protrusion. For example, each of the metal wires covers at least one surface for polarization of one resin protrusion. Under the circumstances, in an aspect, an incident light can be polarized by oscillation properties of free electrons in the metal wire covering the resin protrusions, such that a wire grid polarizer with reflection properties can be formed. In another aspect, since the resin protrusions are formed of a resin material, the consumption of a metal material can be reduced in the manufacturing of a wire grid polarizer, and the manufacture cost can be reduced because the cost of a resin material is lower than the cost of a metal target material.

The present invention provides a display device, comprising any one of above wire grid polarizers, and achieving the same advantage effects as described for the wire grid polarizers in the above embodiments. The structure, manufacturing method and advantage effect of a wire grid polarizer has been described in detail in above embodiments, and thus will need not to be described herein.

It should be noted that, in an embodiment of the present invention, a display device can at least specifically comprise a liquid crystal display device and an organic light-emitting diode display device. For example, such a display device can be any product or part having a display function, such as a liquid crystal display, a liquid crystal TV, a digital photo frame, a cell phone, or a tablet, etc.

The present invention comprises the following embodiments:

Embodiment 1

A wire grid polarizer, comprising: a base substrate; resin protrusions disposed on a surface of the base substrate with intervals being provided between the resin protrusions; and metal wires disposed on the surface of the base substrate with intervals being provided between the metal wires, the metal wires forming a pattern of wire grid; wherein each of the metal wires covers at least one surface for polarization of the resin protrusions, and the surface for polarization is at least one of an upper surface and a side surface of the resin protrusions, and the side surface is parallel to an arrangement direction of the wire grid.

Embodiment 2

The wire grid polarizer according to embodiment 1, wherein a material for forming the resin protrusions comprises an acrylic polymer; and a material for forming the metal wires comprises at least one selected from the group consisting of elementary substance aluminum, elementary substance copper, and elementary substance iron.

Embodiment 3

The wire grid polarizer according to embodiment 1 or 2, wherein the metal wires are arranged at a period of less than or equal to 100 nm.

Embodiment 4

The wire grid polarizer according to any one of embodiments 1-3, wherein each of the metal wires has a width of less than or equal to 50 nm.

Embodiment 5

The wire grid polarizer according to any one of embodiments 1-4, wherein a sum of a thickness of the resin protrusions and a thickness of the metal wires is 20 nm-100 nm.

Embodiment 6

The wire grid polarizer according to any one of embodiments 1-5, wherein a material for forming the base substrate comprises at least one selected from the group consisting of glass and quartz, or at least one selected from the group consisting of polyethylene glycol terephthalate and cellulose triacetate.

Embodiment 7

The wire grid polarizer according to any one of embodiments 1-6, wherein each of the metal wires covers at least one surface for polarization of one resin protrusion.

Embodiment 8

A display device, comprising a wire grid polarizer according to any one of embodiments 1-7.

Embodiment 9

A method for manufacturing a wire grid polarizer, wherein, the wire grid polarizer comprises: a base substrate; resin protrusions disposed on a surface of the base substrate with intervals being provided between the resin protrusions; metal wires disposed on the surface of the base substrate with intervals being provided between the metal wires, the metal wires forming a pattern of wire grid; wherein each of the metal wires covers at least one surface for polarization of the resin protrusions, and the surface for polarization is at least one of an upper surface and a side surface of the resin protrusions, and the side surface is parallel to an arrangement direction of the wire grid; the method comprises: coating a polymer monomer on the surface of the base substrate; subjecting the polymer monomer at a position corresponding to the resin protrusions to a curing treatment; forming a pattern of the resin protrusions disposed on the surface of the base substrate with intervals being provided between the resin protrusions; forming a metal layer on the surface of the substrate provided with the resin protrusions; and forming a pattern of wire grid formed of the metal wires disposed on the surface of the base substrate with intervals being provided between the metal wires by a single patterning process, such that each of the metal wires covers at least one surface for polarization of one resin protrusion.

Embodiment 10

The method for manufacturing the wire grid polarizer according to embodiment 9, wherein forming of the resin protrusions after coating the polymer monomer on the surface of the base substrate comprises: disposing a first mask plate on a surface of the polymer monomer, and exposing a position of the polymer monomer corresponding to a transparent area of the first mask plate; and removing the polymer monomer corresponding to a shielding area of the first mask plate.

Embodiment 11

A method for manufacturing the wire grid polarizer according to embodiment 9, wherein forming of the resin protrusions after coating the polymer monomer on the surface of the base substrate comprises: stamping a stamping die into the polymer monomer to contact the stamping die with the base substrate; exposing the polymer monomer within the stamping die; and separating the stamping die from the polymer monomer subjected to exposure and the base substrate.

Embodiment 12

The method for manufacturing the wire grid polarizer according to embodiment 11, wherein the stamping die is formed of a transparent material.

Embodiment 13

The method for manufacturing the wire grid polarizer according to embodiment 10 or 11, wherein forming of the pattern of wire grid formed of metal wires disposed on the surface of the base substrate by a patterning process such that each of the metal wires covers a resin protrusion comprises: coating a photoresist layer on a surface of the metal layer; forming a photoresist-reserved area corresponding to a pattern of metal wires to be formed and a photoresist-removed area corresponding to other areas on the surface of the metal layer on the surface of the metal layer by a single mask exposure process and a developing process with a second mask plate; wherein, a width of an opaque area of the second mask plate is greater than a width of a transparent area of the first mask plate; or, the width of the opaque area of the second mask plate is greater than a width of a groove of the stamping die; etching the metal layer corresponding to the photoresist-removed area to etching; and removing a photoresist layer corresponding to the photoresist-reserved area to form a pattern of the metal wires.

Embodiment 14

The method for manufacturing the wire grid polarizer according to embodiment 9, wherein a material for forming the polymer monomer comprises an acrylic monomer; and a material for forming the metal layer comprises at least one of elementary substance aluminum, elementary substance copper, and elementary substance iron.

Embodiment 15

The method for manufacturing the wire grid polarizer according to embodiment 9, wherein a sum of a thickness of the polymer monomer and a thickness of the metal layer is 20 nm-100 nm.

Embodiment 16

The method for manufacturing the wire grid polarizer according to any one of embodiments 9-15, wherein a material for forming the resin protrusions comprises an acrylic polymer; and a material for forming the metal wires comprises at least one selected from the group consisting of elementary substance aluminum, elementary substance copper, and elementary substance iron.

Embodiment 17

The method for manufacturing the wire grid polarizer according to any one of embodiments 9-16, wherein the metal wires are arranged at a period of less than or equal to 100 nm.

Embodiment 18

The method for manufacturing a wire grid polarizer according to any one of embodiments 9-17, wherein each of the metal wires has a width of less than or equal to 50 nm.

Embodiment 19

The method for manufacturing the wire grid polarizer according to any one of embodiments 9-18, wherein a sum of a thickness of a resin protrusion and a thickness of a metal wire is 20 nm-100 nm Embodiment 20

The method for manufacturing a wire grid polarizer according to any one of embodiments 9-19, wherein a material for forming the base substrate includes at least one selected from the group consisting of glass and quartz, or at least one selected from the group consisting of polyethylene glycol terephthalate and cellulose triacetate.

Embodiment 21

The method for manufacturing the wire grid polarizer according to any one of embodiments 9-20, wherein each of the metal wires covers at least one surface for polarization of one resin protrusion.

The forgoing is only the illustrative embodiments of the present invention and not intended to limit the protection scope of the present invention. The protection scope of the present invention should be defined by the appended claims.

The present invention claims priority of the Chinese patent application No. 201410843630.5, filed on Dec. 30, 2014, the disclosure of which is incorporated herein by reference as part of the application.

The invention claimed is:
1. A wire grid polarizer, comprising:
a base substrate;
resin protrusions disposed on a surface of the base substrate with intervals being provided between the resin protrusions; and
metal wires disposed on the surface of the resin protrusions with intervals being provided between the metal wires, the metal wires forming a pattern of wire grid;
wherein each of the metal wires covers and contacts with all surfaces for polarization of the resin protrusions, and the surfaces for polarization are upper surface and side surfaces of the resin protrusions, and the side surfaces are parallel to an arrangement direction of the wire grid;
wherein a thickness of the metal wires on the upper surface is same as a thickness of the metal wires on the side surfaces of the resin protrusions.

2. The wire grid polarizer according to claim 1, wherein a material for forming the resin protrusions comprises an acrylic polymer; and a material for forming the metal wires comprises at least one selected from the group consisting of elementary substance aluminum, elementary substance copper, and elementary substance iron.

3. The wire grid polarizer according to claim 1, wherein the metal wires are arranged at a period of less than or equal to 100 nm.

4. The wire grid polarizer according to claim 1, wherein each of the metal wires has a width of less than or equal to 50 nm.

5. The wire grid polarizer according to claim 1, wherein a sum of a thickness of the resin protrusions and a thickness of the metal wires is 20 nm to 100 nm.

6. The wire grid polarizer according to claim 1, wherein a material for forming the base substrate comprises at least one selected from the group consisting of glass and quartz, or at least one selected from the group consisting of polyethylene glycol terephthalate and cellulose triacetate.

7. The wire grid polarizer according to claim 1, wherein each of the metal wires covers at least one surface for polarization of one resin protrusion.

8. A display device, comprising the wire grid polarizer according to claim 1.

9. A method for manufacturing a wire grid polarizer, wherein, the method comprises:

coating a layer of a polymer monomer on a surface of a base substrate;

subjecting the layer of the polymer monomer at a position corresponding to resin protrusions to a curing treatment;

forming a pattern of the resin protrusions disposed on the surface of the base substrate with intervals being provided between the resin protrusions;

forming a metal layer on the surface of the resin protrusions; and forming a pattern of wire grid formed of metal wires disposed on the surface of the base substrate with intervals being provided between the metal wires by a single patterning process, such that each of the metal wires covers and contacts with all surfaces for polarization of one resin protrusion, wherein a thickness of the metal wires on the upper surface is same as a thickness of the metal wires on the side surfaces of the resin protrusions.

10. The method for manufacturing the wire grid polarizer according to claim 9, wherein forming of the resin protrusions after coating the layer of the polymer monomer on the surface of the base substrate comprises:

disposing a first mask plate on a surface of the layer of the polymer monomer, and exposing a position of the layer of the polymer monomer corresponding to a transparent area of the first mask plate; and removing the layer of the polymer monomer corresponding to a shielding area of the first mask plate.

11. A method for manufacturing the wire grid polarizer according to claim 9, wherein forming of the resin protrusions after coating the layer of the polymer monomer on the surface of the base substrate comprises:

stamping a stamping die into the layer of the polymer monomer to contact the stamping die with the base substrate;

exposing the polymer monomer within the stamping die; and separating the stamping die from the polymer monomer subjected to exposure and the base substrate.

12. The method for manufacturing the wire grid polarizer according to claim 11, wherein the stamping die is formed of a transparent material.

13. The method for manufacturing the wire grid polarizer according to claim 10, wherein forming of the pattern of wire grid formed of metal wires disposed on the surface of the base substrate by a patterning process such that each of the metal wires covers a resin protrusion comprises:

coating a photoresist layer on a surface of the metal layer;

forming a photoresist-reserved area corresponding to a pattern of metal wires to be formed and a photoresist-removed area corresponding to other areas on the surface of the metal layer on the surface of the metal layer by a single mask exposure process and a developing process with a second mask plate; wherein, a width of an opaque area of the second mask plate is greater than a width of a transparent area of the first mask plate; or, the width of the opaque area of the second mask plate is greater than a width of a groove of the stamping die;

etching the metal layer at a position corresponding to the photoresist-removed area; and removing a photoresist layer corresponding to the photoresist-reserved area to form a pattern of the metal wires.

14. The method for manufacturing the wire grid polarizer according to claim 9, wherein a material for forming the layer of the polymer monomer comprises an acrylic monomer; and a material for forming the metal layer comprises at least one of elementary substance aluminum, elementary substance copper, and elementary substance iron.

15. The method for manufacturing the wire grid polarizer according to claim 9, wherein a sum of a thickness of the layer of the polymer monomer and a thickness of the metal layer is 20 nm to 100 nm.

16. The method for manufacturing the wire grid polarizer according to claim 9, wherein a material for forming the resin protrusions comprises acrylic polymer; and a material for forming the metal wires comprises at least one selected from the group consisting of elementary substance aluminum, elementary substance copper, and elementary substance iron.

17. The method for manufacturing the wire grid polarizer according to claim 9, wherein the metal wires are arranged at a period of less than or equal to 100 nm.

18. The method for manufacturing a wire grid polarizer according to claim 9, wherein each of the metal wires has a width of less than or equal to 50 nm.

19. The method for manufacturing the wire grid polarizer according to claim 9, wherein a sum of a thickness of a resin protrusion and a thickness of a metal wire is 20 nm to 100 nm.

20. The method for manufacturing a wire grid polarizer according to claim 9, wherein a material for forming the base substrate includes at least one selected from the group consisting of glass and quartz, or at least one selected from the group consisting of polyethylene glycol terephthalate and cellulose triacetate.

* * * * *